(12) United States Patent  
Thundyil et al.

(10) Patent No.: US 7,413,657 B1  
(45) Date of Patent: Aug. 19, 2008

(54) METHOD FOR SELECTIVE EXTRACTION

(75) Inventors: Mathews J. Thundyil, The Woodlands, TX (US); Heath Burns, Conroe, TX (US); Douglas M. Mittlesteadt, Saline, MI (US); Martin G. Miller, The Woodlands, TX (US); Michael R. Spearman, The Woodlands, TX (US)

(73) Assignee: Porous Media Ltd., Conroe, TX (US)

( * ) Notice: Subject to any disclaimer, the term of this patent is extended or adjusted under 35 U.S.C. 154(b) by 227 days.

(21) Appl. No.: 10/725,959

(22) Filed: Dec. 2, 2003

(51) Int. Cl.  
*B01D 11/00* (2006.01)

(52) U.S. Cl. .................. 210/634; 210/702; 210/738; 210/799; 556/466

(58) Field of Classification Search .......... 210/634, 210/639, 708, 799, DIG. 5, 702, 738; 556/465–467; 204/186, 190, 302, 305; 435/262, 262.5; 208/219, 237; 528/10, 12  
See application file for complete search history.

(56) References Cited

U.S. PATENT DOCUMENTS

| | | | | |
|---|---|---|---|---|
| 2,469,883 A | * | 5/1949 | Marsden et al. | 528/23 |
| 3,561,193 A | * | 2/1971 | Baranowski | |
| 5,206,330 A | * | 4/1993 | Kobayashi et al. | 528/23 |
| 5,358,614 A | * | 10/1994 | Scott et al. | 204/563 |
| 5,401,821 A | * | 3/1995 | Geck et al. | 528/12 |
| 5,458,752 A | * | 10/1995 | Lizama et al. | 204/164 |
| 5,548,053 A | * | 8/1996 | Weidner et al. | 528/14 |
| 5,968,812 A | * | 10/1999 | Mrachko | 435/262 |
| 6,413,429 B1 | * | 7/2002 | Breman et al. | 210/634 |

FOREIGN PATENT DOCUMENTS

GB  1443704  * 7/1976

* cited by examiner

*Primary Examiner*—Joseph W Drodge  
(74) *Attorney, Agent, or Firm*—Jacobson & Jacobson; Thomas N. Phung

(57) ABSTRACT

A process for the extraction of an unwanted material from a fluid containing the unwanted material comprising the steps of introducing an immiscible extraction fluid into the fluid having an unwanted material therein to form a plurality of extraction fluid droplets in the fluid, allowing the plurality of extraction fluid droplets to hydrophilicly interact with the unwanted material in the fluid to cause the extraction fluid droplets to form into a plurality of coalesceable droplets, coalescing the coalesceable droplets into larger droplets containing the unwanted material, and separating the larger droplets containing the unwanted material from the fluid.

26 Claims, 3 Drawing Sheets

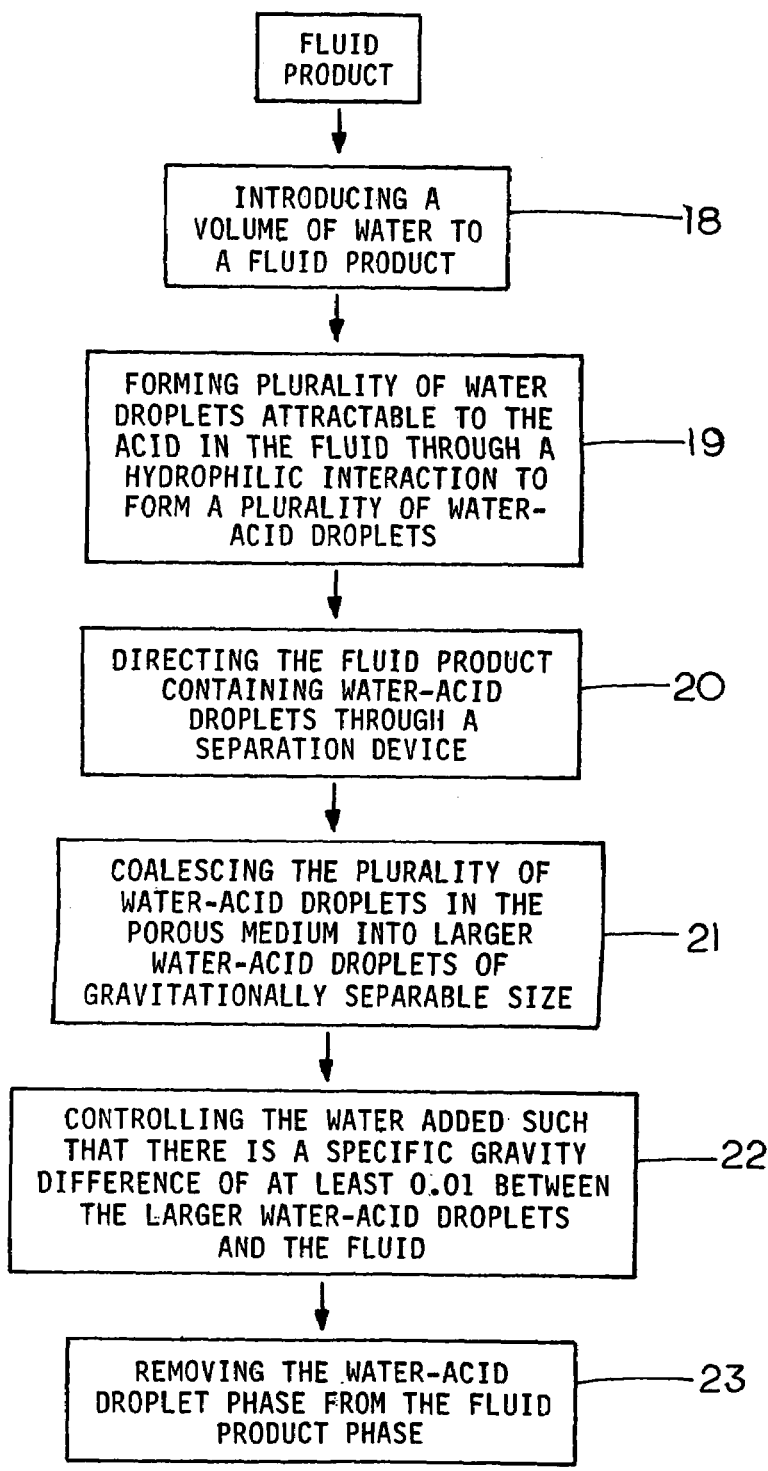

METHOD FOR SELECTIVE EXTRACTION

FIELD OF THE INVENTION

The present invention relates generally to removal of unwanted materials from a fluid and particularly to a process for the selective removal of catalysts such as acids from a fluid.

CROSS REFERENCE TO RELATED APPLICATIONS

None

STATEMENT REGARDING FEDERALLY SPONSORED RESEARCH OR DEVELOPMENT

None

REFERENCE TO A MICROFICHE APPENDIX

None

BACKGROUND OF THE INVENTION

Acids are used to catalyze reactions in a number of different syntheses in the refining, chemical, petrochemical and pharmaceutical industries among others. Acids may also be formed as a result of syntheses, as reaction byproducts. Following the synthesis, it is often desired to eliminate the acid from the fluid. Elimination of the acid from the fluid is traditionally accomplished by means of base neutralization which typically involves a two-step process, one of neutralization and another of excess neutralizer and neutralization byproduct removal. That is, a base in the form of a liquid or a solid is added to the fluid to neutralize the acids. Typically an excess of the base neutralizer must be added to assure complete removal of acid. As a result of the neutralization of the acid by the base neutralizer, salt byproducts are formed. Following the acid neutralization process, the excess base neutralizer and salt byproducts must be removed.

If the base is a solid, the excess base and salts are typically removed by filtration. If the base is a liquid and a separate phase from the fluid, the neutralization is generally accomplished in columns where the base is dispersed into the product stream to facilitate the neutralization. The excess base and reaction byproducts are subsequently removed by means of a two-phase separator. Since an excess of the neutralizing compound must be added, the specific gravity between the two phases becomes very close and difficult to separate via conventional two-phase separators. Therefore, these devices are not very efficient at accomplishing a complete separation of the two phases. As a result, there is typically some base carryover from the two-phase separator, which results in the need for a water-wash tower designed to further separate the two phases.

A disadvantage of the above conventional two-stage acid neutralization process is that each of the steps has associated capital costs for the hardware such as towers and reaction tanks, and operating costs. A further disadvantage is the cycle time associated with the steps of neutralization and removal of excess neutralizer and neutralization byproducts. A further disadvantage is the necessity of adding a considerable excess of neutralizing or extracting agent, resulting in a two phase system that is very close in specific gravity between the two phases and therefore very difficult to separate using conventional two-phase separators such as coalescers, mesh-pads or vane packs, residence time devices, centrifuges etc. As a result of the shortcomings of the above conventional acid catalyst removal techniques, there is a need for a process for selective removal of the unwanted materials such as acids that overcomes these disadvantages.

The present invention provides a process for the removal of an unwanted liquid from a fluid and particularly an acid from the fluid by introducing a relatively small volume of polar liquid to extract the acid from the primary phase fluid through a hydrophilic interaction between the polar liquid and the acid. The extractive fluid may have a specific gravity very close to that of the primary phase fluid. Specifically, this invention relates to the process of creating a dispersion of an extractive liquid that is substantially immiscible in the fluid to hydrophilicly interact with the acid in the fluid, to form an acid-rich liquid phase that is stably dispersed in the primary phase fluid. This stable dispersion, may be defined as a stable suspension of a discontinuous liquid phase within another continuous liquid phase, wherein the discontinuous liquid phase comprises droplets which remains dispersed or suspended in the continuous liquid phase for an extended period, the droplets not separable by conventional liquid/liquid separation technologies—such as filter-coalescers, residence time coalescers with mesh-pads or vane-packs, centrifuges etc. This stable dispersion functions to facilitate the intimate mass-transfer between the primary and secondary phases.

As an example, the above-mentioned process can be used with a dispersion comprising droplets of a discontinuous liquid phase having diameters in the 0.1-3 micron range, or smaller although larger droplets having a diameter extending up to 10 micron range are also possible, as long as the droplets remain dispersed or suspended. Following the dispersion, the present invention uses a coalescer such as a porous medium to capture, coalesce, and separate the acid-rich liquid in the form of droplets from the fluid.

Although other embodiments of a porous medium may be used to capture the droplets, in the present invention the porous medium is preferably constituted with fibers of sufficient dimensions to capture these droplets. The aforementioned fibers are typically on the order of magnitude of the droplets, that is, the porous medium usually contains of fibers that have diameter in the 0.5-2 microns range although it is conceivable that fibers of other dimensions can also be used.

One of the advantages of the present invention is that once the water-acid droplets have been removed into a continuous secondary phase, this secondary phase can be dehydrated to remove some of the water so that the acid can be reused for future applications thus eliminating waste.

DESCRIPTION OF THE PRIOR ART

U.S. Pat. No. 6,458,408 discloses a process for producing a citrus washed oil flavor;

U.S. Pat. No. 6,422,396 discloses a coalescing filter element for the separation of water from hydrocarbon fluids under surfactant conditions;

U.S. Pat. No. 6,413,429 discloses a process and apparatus for extracting a component dissolved in a liquid by means of a liquid-liquid extraction;

U.S. Pat. No. 6,332,987 discloses a coalescer element and a method for coalescing a discontinuous phase from a continuous phase of a fluid;

U.S. Pat. No. 6,068,779 discloses a method for separating a small quantity of oil intimately mixed with water and vice versa;

U.S. Pat. No. 5,885,535 discloses a process for extracting and separating silver from solids containing slightly soluble silver compounds; and U.S. Pat. No. 5,480,547 discloses a liquid purification system capable of separating a corrosive aqueous liquid that is wholly or immiscible in an organic liquid.

SUMMARY OF THE INVENTION

The present invention provides a process for the extraction of an unwanted material such as an acid from a fluid through the introduction of a relatively small volume of a polar liquid such as water into the fluid to create a stable dispersion of polar liquid droplets. A stable dispersion is one that does not readily separate over a number of days. By forming small diameter polar droplets one can form a stable emulsion with the polar droplets dispersed throughout the fluid. When used with an acid the small diameter polar droplets and the acid in the fluid attract each other through a hydrophilic interaction to form a plurality of droplets containing acid. Typically, these droplets are smaller than droplets, which can be separated by conventional liquid/liquid coalescers including mesh pads, vane-packs, residence time separators, API separators, or filter-separators.

The fluid containing the polar droplets which are generally not separable by conventional separators are then directed to a porous medium that has the capability to capture and grow the polar droplets. The polar droplets are coalesced on the fibers of the coalescing device to form larger polar droplets, which can be gravitationally separated from the fluid. Once gravitationally separated, the larger polar droplets can then be removed from the fluid through a conventional liquid-liquid separation device. Although water as a polar liquid works well, other liquids in the form of base or buffer solutions can be used in the process of the present invention.

BRIEF DESCRIPTION OF THE DRAWINGS

FIG. 4 is a schematic of a process whereby the acid extraction system is utilized.

DESCRIPTION OF THE PREFERRED EMBODIMENT

In general the present invention provides a process for the extraction of an unwanted material such as an unwanted liquid from a fluid and in the preferred method, an extraction of an acid from a fluid through the introduction of a relatively small volume of a polar liquid such as water into the fluid to hydrophilicly interact with the acid in the fluid to form a stable dispersion of a plurality of water-acid droplets and then using a coalescer such as a porous medium to capture and coalesce the water-acid droplets into separable size for extraction of the acid in the form of the water-acid droplets. An example of another polar liquid, which can be used in the present invention, include sodium hydroxide in water.

The fluid from which the acid is being extracted is preferably but not limited to fluids that are not very soluble in water including hydrocarbon fluids and silicone fluid. The acid(s) that can be extracted from the fluid by the present process include but are not limited to sulfuric acid, trimethylsulfonic acid and hydrochloric acid. The acid can occur in the free, emulsified, dispersed or dissolved forms in the fluid.

Figure 1:
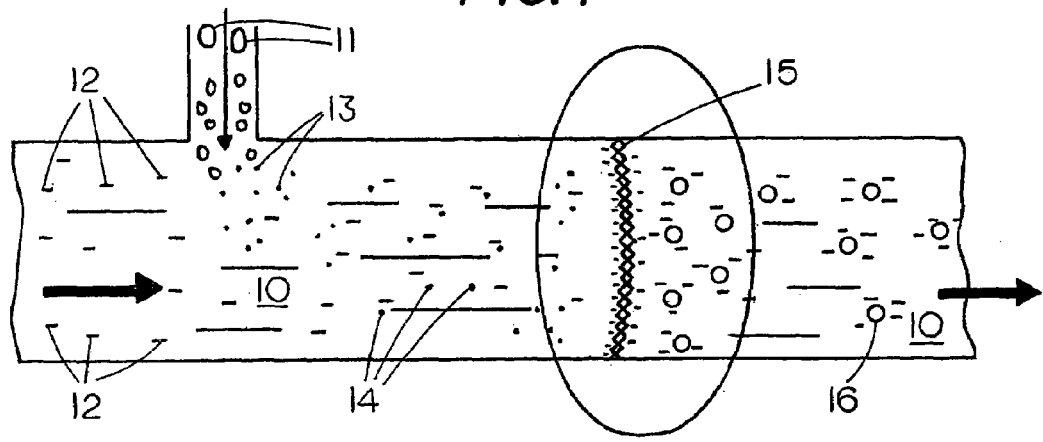
FIG. 1 shows a simplified sectional view of an apparatus for introducing a polar liquid into a fluid containing an acid.

FIG. 1 shows a simplified sectional view of an apparatus for introducing a polar liquid into a fluid 10 containing an acid 12. As shown in FIG. 1, the acid 12 is dispersed throughout the fluid 10. In the process of extracting the acid 12 from fluid 10, a volume of a polar extraction liquid such as water 11 is introduced into the fluid 10 containing the acid 12. Since the acid 12 in the fluid 10 has a much greater affinity for water 11 than for the fluid 10, the acid 11 will move away from fluid 10 and move towards the water 11.

To further speed up the movement of the acid 12 towards the water, the water 11 introduced into the fluid 10 can be formed into a plurality of micro droplets 13, which are then dispersed through out fluid 10 thereby creating a stable physical emulsion or microdispersion of water droplets. The water 11 is formed into the stable emulsion of water droplets 13 by various means such as but not limited to mixing, pressurizing, or agitating the water 11. The stable emulsion of water droplets 13 formed are sufficiently small so that the water droplets 13 cannot be effectively separated by conventional residence-time devices such as mesh-pads, vane-packs, conventional "filter-separators," conventional extraction columns with structured or random packing. Although the water droplets may be larger in size, the present method preferably utilizes water droplets having diameters ranging from about 10 microns or smaller.

The dispersal of the water droplets 13 (i.e., stable emulsion of water droplets) throughout the fluid 10 speeds up the transport of the acid 12 to the water since the distance that the acid 12 has to travel to reach and hydrophilicly interact with the water is greatly reduced. Once the acid reaches the stable emulsion of water droplets 13, due to the uneven distribution of charges in the water molecules, the water droplets 13 in the stable emulsion and the acid 12 in the fluid 10 are attracted to each other through a hydrophilic interaction to form a further stable emulsion comprising a plurality of water-acid droplets 14.

The fluid 10 containing the stable emulsion of water-acid droplets 14 is then directed to a coalescer such as a porous medium 15. The porous medium 15 has an extended surface area for fluid to flow therethrough. Porous medium 15 can have various shapes and sizes, such as for example a conical, cylinder or frustum configuration. The porous medium 15 may also comprise a single sheet that is pleated to provide an extended surface area for separation or multiple sheets of porous medium sandwiched together to form an asymmetric-shaped medium having pore size distributions and interfacial energy properties varying in the direction of flow. A frustum configuration is particularly attractive since it provides for the lowest annular velocities in the disengagement chamber, thereby facilitating the separation.

One of the characteristics of the porous medium 15 used in the present invention is that the porous medium 15 has an appropriate chemical compatibility with the fluid 10 and the extraction liquid such as water, while having the capability to capture and coalesce the plurality of water-acid droplets 14 into a plurality of larger water-acid droplets 16 (shown in FIG. 1) and then release the plurality of larger water-acid droplets when they are grown to a size that can be gravitationally separated from the fluid.

Porous medium 15 can be configured horizontally such that the plurality of larger water-acid droplets 16 and the fluid 10 exits the porous medium in a direction that is perpendicular to the direction in which the water 11 was initially introduced into the fluid 10. Conversely, the porous medium 15 can also be configured vertically such that the plurality of larger water-acid droplets 16 and the fluid 10 exits the porous medium in a direction that is parallel to the direction in which the water 11 was initially introduced into the fluid 10.

Figure 2:
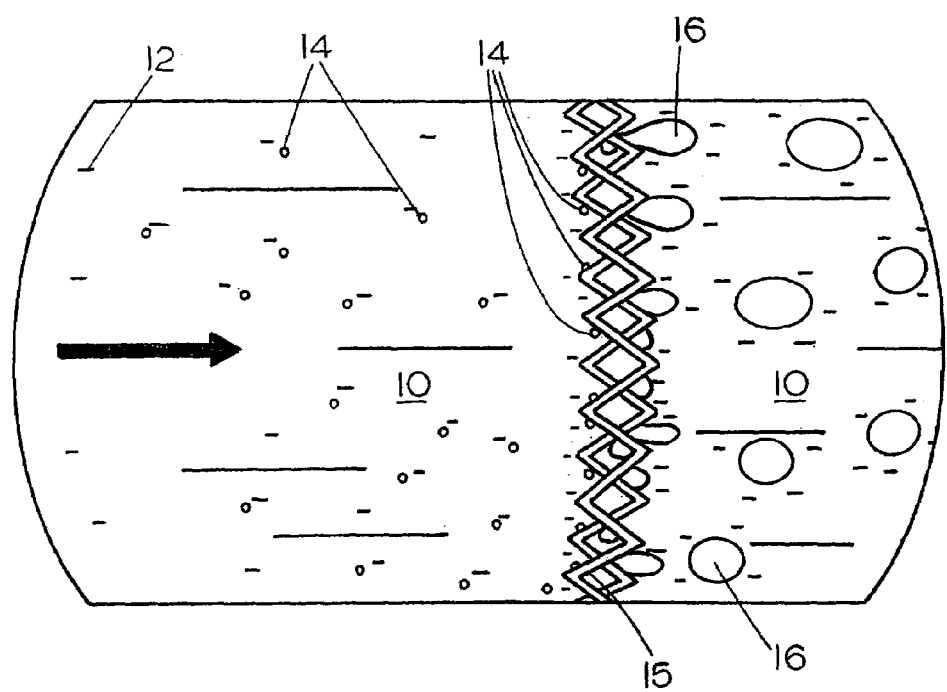
FIG. 2 shows a close-up view of the porous medium of FIG. 1.

As shown in FIG. 1 and more clearly shown in FIG. 2, once the stable emulsion of water-acid droplets 14 reach the porous medium 15, the stable emulsion of water-acid droplets 14 are captured in the porous medium 15, and coalesce in the porous medium 15 to form the plurality of larger water-acid droplets 16. One of the characteristics of the larger water-acid droplets 16 is that the larger water-acid droplets 16 captured in the medium grows to a size that can be gravitationally separated from the fluid.

Once the larger water-acid droplets 16 are formed to a separable size on the porous medium 15, the larger water-acid droplets 16 separate from the porous medium 15 and gravitationally settle in a phase separate from the fluid (not shown). After the larger water-acid droplets 16 have settled (not shown), the larger water-acid droplets 16 can then be removed from the fluid 10 by various conventional means such as through a liquid-liquid separation device.

In liquid-liquid separations, the difficulty in separating the different liquids increase as specific gravity of the liquids grow closer to each other. Conventional liquid-liquid separation devices usually require a significant difference in the specific gravity of the different liquids in order to provide for their separation. For example, U.S. Pat. No. 6,413,429 to Breman et. al. requires a specific gravity difference of at least 0.05 or 5% in order to separate Breman's fluids.

To ensure that there is a separable fluid one should control the amount of water 11 added to the fluid ensure that there is a specific gravity difference of at least 0.01 between the larger water-acid droplets 16 and the fluid 10.

For example, water has a specific gravity of 1.00. In extracting an acid with a relatively high specific gravity, such as sulfuric acid (specific gravity of about 1.80), from a silicone fluid having a specific gravity of about 0.99, the introduction of a small volume of water into the silicone fluid will result in the formation of water-sulfuric acid droplets due to the hydrophilic interaction between the water droplets and the sulfuric acid. Since the water has a lower specific gravity than the sulfuric acid, the interaction between the sulfuric acid and the water will result water-sulfuric acid droplets having a lower specific gravity than the sulfuric acid. Due to the small amount of water that is added to the silicone fluid at the outset, the water-sulfuric acid droplets will initially have a specific gravity that is closer to the sulfuric acid than the silicone fluid. However, as more water is introduced, the specific gravity of the water-sulfuric acid droplets will decrease thus moving the specific gravity of the water-sulfuric acid droplets closer to the specific gravity of the silicone fluid. In the present scenario, in order to maintain the water-sulfuric acid droplets in separable form from the silicone fluid, the amount of water added to the silicone fluid can be controlled so that the specific gravity of the water-sulfuric acid droplets does not drop below 1.00 (i.e. 0.01 from the specific gravity of the silicone fluid).

In situations in which a user is extracting an acid from a silicone fluid with the particular acid to be extracted having a lower specific gravity than the silicone fluid, the introduction of a volume of water into the silicone fluid will again result in the formation of water-acid droplets due to the hydrophilic interaction between the water droplets and the acid. But unlike the water-sulfuric acid droplets, the interaction between the above acid and the water will result in the water-acid droplets having a specific gravity greater than or less than the silicone fluid, depending on the amount of water added. At low concentrations, the water-acid phase will have a specific gravity lower than that of the silicone, and at high concentrations of water the specific gravity may be greater than that of the silicone. However, as long as there is at least a 0.01 specific gravity difference between the water-acid droplets and the silicone fluid, a separation of the water-acid droplets from the silicone fluid can be accomplished.

FIG. 2 is a close-up view of the porous medium 15 of FIG. 1 showing the manner in which the porous medium 15 coalesces the water-acid droplets 14 into larger size water-acid droplets 16 of sufficient size to gravitationally settle in the fluid 10.

The porous medium 15 used in the present invention can be made from either an inorganic material and/or an organic material. Examples of suitable inorganic materials include but are not limited to glass of various types, inorganic polymers and ceramic. Examples of suitable organic materials include but are not limited to polyolefins, polyphenylene sulfides, polyimides, polycarbonates, poly aramids, polyesters, polyamides, fluorinated polymers, Teflon, polyorganosilanes, polyacrylates, polysulfones, cellulose acetates, cellulosic materials (of natural or synthetic origin), and cotton. These materials may be utilized with or without binders that are designed to maintain structural integrity as well as modify interfacial properties.

Shown in FIG. 2, as the fluid 10 passes through the porous medium 15, the water-acid water droplets 14 are captured. As more and more water-acid droplets 14 are captured, the captured water-acid droplets 14 coalesce to form the larger acid-water droplets 16. Once the larger acid-water droplets 16 have grown to a gravitationally separable size, they are pulled away from the porous medium 15 by the fluid 10 that is moving through the porous medium 15.

In connection with the present process, although not required, it is preferable to filter the incoming fluid 10 to prevent the plugging and destruction of the porous medium 15 by particulate matter entrained in the fluid. Plugging of the porous medium 15 by particulates causes the undesirable effect of an increase in the pressure drop across the system. It is preferred that the limiting pressure drop across the porous medium to be less than 20 psi, preferably under 10 psi.

Figure 3:
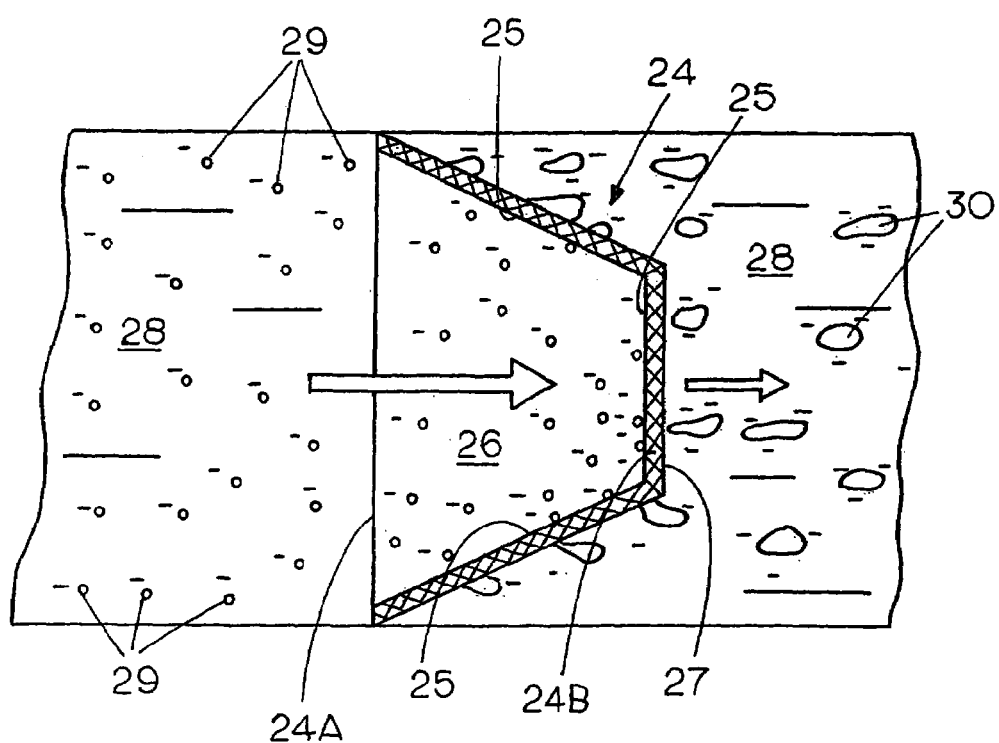
FIG. 3 shows a frustum-shaped porous medium to facilitate droplet coalescence.

FIG. 3 is a close-up view of an alternative embodiment of a porous medium 24 of the present invention. Porous medium 24 comprises a frustum shaped body having an opened end 24A, a closed end 24B, an interior surface 25, an exterior surface 27 and a cavity 26.

In the operation of the frustum shaped porous medium 24, as shown in FIG. 3, a fluid 28 enters the interior or cavity 26 of the frustum shaped porous medium 24 at the opened end 24A of the frustum shaped porous medium 24. The fluid then moves through cavity 26 until the fluid 28 reaches the interior surface 25 of the frustum shaped porous medium 24. At the interior surface 25 of the frustum shaped porous medium 24 the water-acid water droplets 29 are captured. As more and more water-acid droplets 29 are captured, the captured water-acid droplets 29 coalesce to form the larger acid-water droplets 30. Once the larger acid-water droplets 30 have grown to a gravitationally separable size, they are pulled away from the exterior surface 27 of the frustum shaped porous medium 24 by the fluid 28 that is moving through the frustum shaped porous medium 24.

FIG. 4 is a block diagram view outline a process of acid extraction. More specifically, the process of acid removal as shown in FIG. 4 comprises the steps of: (18) introducing a small volume of water 11 into the fluid 10 containing an acid 12; (19) forming a plurality of water droplets 13 in the fluid 10 to create a stable physical emulsion with the water droplets 13 having a size that is sufficiently small so that the droplets do not gravitationally settle but are attractable to the acid through a hydrophilic interaction to form a plurality of water-acid droplets 14; (20) directing the fluid containing the plurality of water-acid droplets 14 to a separation device such as a coalescer comprising a porous medium 15 in which the porous medium 15 comprises an extended surface area design in an frustum or conical configuration; (21) coalescing the plurality of water-acid droplets 14 in the porous medium 15 into a plurality of larger water-acid droplets 16, allowing the plurality of larger water-acid droplets 16 to gravitationally separate from the fluid; (22) controlling the amount of water added such that there is a specific gravity difference of at least 0.01 between the water-acid droplets 16 and fluid 10; and (23) separating the larger water-acid droplets 16 from the fluid to thereby remove the acid 12 from the fluid 10.

Thus in one embodiment the present process comprises a process for the extraction of an unwanted liquid from a fluid by introducing an immiscible extraction liquid into a fluid having an unwanted liquid therein to form a physical emulsion comprised of a plurality of extraction liquid droplets and the fluid. One allows the plurality of extraction liquid droplets to hydrophilically interact with the unwanted liquid in the fluid to cause the extraction liquid droplets to form into a plurality of droplets containing the extracted phase. Next, one coalesces these droplets into larger droplets containing the unwanted liquid. At this point one can separate the larger droplets containing the unwanted liquid from the fluid.

While the process has been described using water as an extract liquid, other liquids could be used that exhibit a polar attraction for an acid.

We claim:

1. A process for the extraction of an unwanted liquid from a fluid comprising:
   introducing an immiscible extraction liquid into a silicone fluid having an unwanted liquid therein by mixing, pressurizing, or agitating to form a physical emulsion to form a plurality of extraction liquid droplets under 10 micron in diameter suspended in the fluid;
   allowing the plurality of extraction liquid droplets to form a polar interaction with the unwanted liquid in the fluid to cause the extraction liquid droplets to form into a plurality of microdispersed droplets containing the unwanted liquid;
   capturing the microdispersed droplets;
   coalescing the microdispersed droplets into larger droplets containing the unwanted liquid;
   controlling a volume of the immiscible extraction liquid introduced into the fluid such that there is a specific gravity difference of as low as 0.01 between the larger droplets containing the unwanted liquid and the fluid; and
   separating the larger droplets containing the unwanted liquid from the fluid.

2. The process of claim 1 wherein the step of introducing an immiscible extraction liquid into a silicone fluid having an unwanted liquid comprises introducing an immiscible extraction liquid into a fluid stream having an unwanted liquid.

3. The process of claim 1 wherein the step of introducing an immiscible extraction liquid into a silicone fluid having an unwanted liquid comprises introducing an immiscible extraction liquid into a fluid having an unwanted acid.

4. The process of claim 1 wherein the step of introducing an immiscible extraction liquid into a silicone fluid having an unwanted liquid comprises introducing water droplets into a silicone fluid having an unwanted liquid.

5. The process of claim 1 wherein the step of capturing the microdispersed droplets comprises capturing the microdispersed droplets with a porous medium.

6. The process of claim 5 wherein the step of capturing the microdispersed droplets with a porous medium comprises capturing the microdispersed droplets with a conical shaped, a cylinder shaped or a frustum shaped porous medium.

7. The process of claim 6 including the step of directing a flow of a fluid stream having an unwanted liquid from an interior of said porous medium through said porous medium to an exterior of said porous medium.

8. The process of claim 5 including the step of orientating the porous medium vertically such that the larger droplets and the fluid exits the porous medium in a direction that is substantially parallel to a direction in which the volume of polar liquid was initially introduced into the fluid.

9. The process of claim 5 including the step of orientating the porous medium horizontally such that the larger droplets and the fluid exits the porous medium in a direction that is substantially perpendicular to each other.

10. A process for the extraction of an unwanted liquid from a fluid comprising:
    introducing water droplets into a silicone fluid having an unwanted acid therein by mixing, pressurizing, or agitating to form a physical emulsion to form a plurality of extraction liquid droplets under 10 micron in diameter suspended in the fluid;
    allowing the plurality of extraction liquid droplets to form a polar interaction with the unwanted liquid in the fluid to cause the extraction liquid droplets to form into a plurality of microdispersed droplets containing the unwanted liquid;
    capturing the microdispersed droplets;
    coalescing the microdispersed droplets into larger droplets containing the unwanted liquid;
    controlling a volume of the immiscible extraction liquid introduced into the fluid such that there is a specific gravity difference of as low as 0.01 between the larger droplets containing the unwanted liquid and the fluid; and
    separating the larger droplets containing the unwanted liquid from the fluid.

11. A process for the extraction of an acid from a fluid comprising the steps of:
    introducing a volume of polar liquid into a silicone fluid containing an acid;
    mixing, pressurizing, or agitating to form a stable physical emulsion to form a plurality of polar liquid droplets under 10 micron in diameter dispersed through out the silicone fluid, said polar liquid droplets attractable to the acid in the silicone fluid through a polar interaction to form a plurality of polar liquid acid droplets;
    capturing the polar liquid acid droplets;
    coalescing the polar liquid acid droplets into a plurality of larger droplets containing the acid;
    controlling an amount of water added to the silicone fluid such that there is a specific gravity difference of as low as 0.01 between the plurality of larger droplets containing the acid and the silicone fluid; and
    separating the larger droplets from the silicone fluid to thereby remove the acid from the silicone fluid.

12. The process of claim 11 wherein the step of introducing a volume of polar liquid into a fluid containing an acid comprises introducing a volume of water into a fluid containing an acid.

13. The process of claim 11 wherein the step of separating the larger droplets from the fluid comprises separating the larger droplets from the fluid by a liquid-liquid separation device.

14. The process of claim 11 wherein the step of coalescing the microdispersed droplets into larger droplets containing the acid comprises capturing and then coalescing the polar liquid acid droplets into larger droplets containing the acid by the use of a porous medium.

15. The process of claim 14 wherein the step of capturing the microdispersed droplets with a porous medium comprises capturing the microdispersed droplets with a conical shaped, a cylinder shaped or a frustum shaped porous medium.

16. The process of claim 14 including the step of directing a flow of a fluid stream having an unwanted liquid from an interior of said porous medium through said porous medium to an exterior of said porous medium.

17. The process of claim 14 including the step of orientating the porous medium vertically such that the larger droplets and the fluid exits the porous medium in a direction that is substantially parallel to a direction in which the volume of polar liquid was initially introduced into the fluid.

18. The process of claim 14 including the step of orientating the porous medium horizontally such that the larger droplets and the fluid exits the porous medium in a direction that is substantially perpendicular to each other.

19. The process of claim 11 wherein the step of forming a stable physical emulsion comprising a plurality of polar liquid droplets under 10 micron in diameter dispersed through out the fluid comprises forming a stable physical emulsion comprising a plurality of polar liquid droplets under 1 micron in diameter dispersed through out the fluid.

20. The process of claim 11 wherein the acid comprise a sulfuric acid, a trimethylsulfonic acid, or a hydrochloric acid.

21. The process of claim 11 wherein the step of introducing a volume of polar liquid into a fluid containing an acid comprises introducing a volume of polar liquid into a hydrocarbon fluid containing an acid.

22. The process of claim 11 wherein the step of introducing a volume of polar liquid into a fluid containing an acid comprises introducing a volume of polar liquid into a fluid stream containing an acid.

23. A process for the extraction of an acid from a fluid comprising of the steps of:
   introducing a volume of water into a silicone fluid stream containing an acid;
   forming a stable emulsion comprising a plurality of water droplets under 10 micron in diameter dispersed throughout the silicone fluid stream, said plurality of water droplets attractable to the acid in the silicone fluid through a hydrophilic interaction to form a plurality of water-acid droplets in the silicone fluid stream;
   capturing the plurality of water-acid droplets;
   directing the silicone fluid stream containing the plurality of water-acid droplets through a coalescer comprising a porous medium;
   coalescing the plurality of water-acid droplets into a plurality of larger water-acid droplets, said larger water-acid droplets gravitationally separable from the silicone fluid;
   controlling the volume of water added such that there is a specific gravity difference of as low as 0.01 between the larger water-acid droplets and the silicone fluid; and
   separating the larger water-acid droplets from the silicone fluid to thereby remove the acid from the silicone fluid.

24. The process of claim 23 wherein the step of introducing a volume of water into a silicone fluid stream containing an acid comprises introducing a volume of water containing a buffer into a silicone fluid stream containing an acid.

25. A process for the extraction of an acid from a fluid comprising of the steps of:
   introducing a volume of water into a silicone fluid stream containing an acid;
   forming a stable emulsion comprising a plurality of water droplets under 10 micron in diameter dispersed throughout the silicone fluid stream, said plurality of water droplets attractable to the acid in the silicone fluid through a hydrophilic interaction to form a plurality of water-acid droplets in the silicone fluid stream;
   capturing the plurality of water-acid droplets;
   directing the silicone fluid stream containing the plurality of water-acid droplets through a coalescer comprising a conical shaped, a cylinder shaped or a frustum shaped porous medium;
   coalescing the plurality of water-acid droplets into a plurality of larger water-acid droplets, said larger water-acid droplets gravitationally separable from the silicone fluid;
   controlling the volume of water added such that there is a specific gravity difference of as low as 0.01 between the larger water-acid droplets and the silicone fluid; and
   separating the larger water-acid droplets from the silicone fluid to thereby remove the acid from the silicone fluid.

26. A process for the extraction of an acid from a fluid comprising of the steps of:
   introducing a volume of water into a silicone fluid stream containing a buffer and an acid;
   forming a stable emulsion comprising a plurality of water droplets under 10 micron in diameter dispersed throughout the silicone fluid stream, said plurality of water droplets attractable to the acid in the silicone fluid through a hydrophilic interaction to form a plurality of water-acid droplets in the silicone fluid stream;
   capturing the plurality of water-acid droplets;
   directing the silicone fluid stream containing the plurality of water-acid droplets through a coalescer comprising a conical shaped, a cylinder shaped or a frustum shaped porous medium;
   coalescing the plurality of water-acid droplets into a plurality of larger water-acid droplets, said larger water-acid droplets gravitationally separable from the silicone fluid;
   controlling the volume of water added such that there is a specific gravity difference as low as 0.01 between the larger water-acid droplets and the silicone fluid; and
   separating the larger water-acid droplets from the silicone fluid to thereby remove the acid from the silicone fluid.

* * * * *